United States Patent [19]

Mueller et al.

[11] Patent Number: 4,799,703

[45] Date of Patent: Jan. 24, 1989

[54] WHEEL SUSPENSION FOR REAR WHEELS OF MOTOR VEHICLES EQUIPPED WITH FRONT WHEEL STEERING, ESPECIALLY PASSENGER MOTOR VEHICLES

[75] Inventors: Rudolf Mueller, Dachau; Ludwig Strasser, Ebersberg, both of Fed. Rep. of Germany

[73] Assignee: Bayerische Motoren Werke Aktiengesellschaft, Munich, Fed. Rep. of Germany

[21] Appl. No.: 151,660

[22] Filed: Feb. 3, 1988

[30] Foreign Application Priority Data

Feb. 3, 1987 [DE] Fed. Rep. of Germany ....... 3703198

[51] Int. Cl.⁴ .................. B60G 3/18; B60G 11/14; B62D 7/14
[52] U.S. Cl. .................... 280/91; 280/696; 280/701; 280/726; 180/140
[58] Field of Search .............. 280/91, 696, 701, 724, 280/725, 726; 180/140

[56] References Cited

U.S. PATENT DOCUMENTS

| | | | |
|---|---|---|---|
| 3,881,741 | 5/1975 | Muller | 280/696 |
| 4,566,709 | 1/1986 | Sano | 280/91 |
| 4,653,772 | 3/1987 | Sautter | 280/696 |
| 4,687,214 | 8/1987 | Uno | 280/91 |
| 4,703,822 | 11/1987 | Kawamoto et al. | 280/91 |
| 4,709,935 | 12/1987 | Takizawa et al. | 280/696 |

Primary Examiner—Kenneth R. Rice
Attorney, Agent, or Firm—Barnes & Thornburg

[57] ABSTRACT

In a wheel suspension for steerable rear wheels of motor vehicles, especially passenger motor vehicles, which include in a customary manner a front wheel steering and additionally a rear wheel steering (four wheel steering), each rear wheel-wheel carrier is connected with the vehicle body or the like exclusively by way of guide members of which one cross guide member is displaceable in the vehicle transverse direction for steering purposes by an adjusting motor and serves as support on the side of the wheel of a support spring supporting the main part of the vehicle.

15 Claims, 2 Drawing Sheets

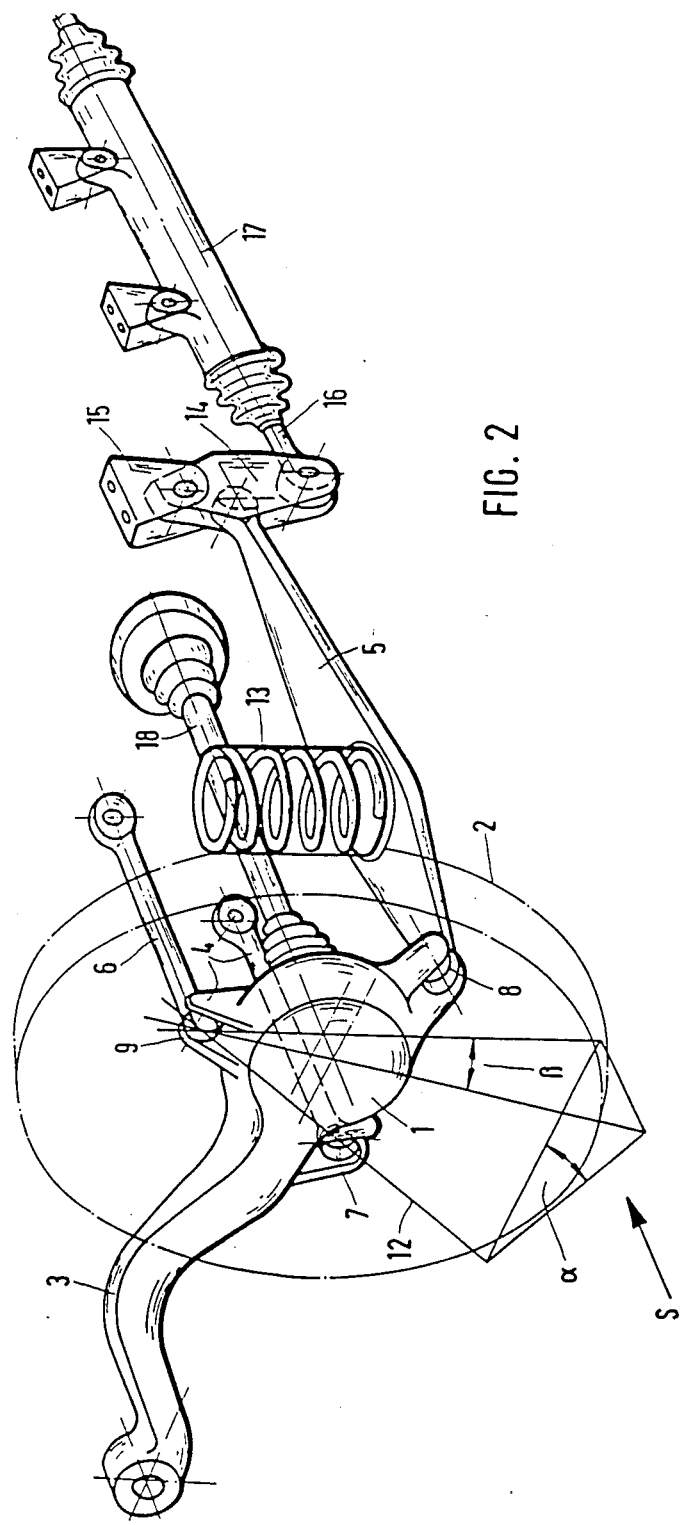

4,799,703

WHEEL SUSPENSION FOR REAR WHEELS OF MOTOR VEHICLES EQUIPPED WITH FRONT WHEEL STEERING, ESPECIALLY PASSENGER MOTOR VEHICLES

BACKGROUND AND SUMMARY OF THE INVENTION

The present invention relates to a wheel suspension for rear wheels of motor vehicles, especially passenger motor vehicles equipped with front wheel steering, which includes a wheel carrier for each rear wheel that is connected by way of wheel guide members with the vehicle body or the like, of which at least three are constructed as cross guide members extending at least approximately in the vehicle transverse direction.

A wheel suspension of this general type suitable, in particular, for driven rear wheels is known from the EP-OS No. 193090, in which with an arrangement having two lower cross guide members, the rear cross guide member supports the support spring constructed as coil spring and a shock absorber, whereas nothing is indicated with an arrangement having two upper cross guide members where the support spring is then to be supported. The known wheel suspension includes a forwardly projecting longitudinal guide member which is secured at its forward end at the vehicle body elastically yieldingly in the vehicle longitudinal direction. By reason of this bearing support and the steering geometry, wheel displacements are possible under the influence of braking and driving forces which change the track width position of the rear wheel. An intentional steering of the rear wheels is not attainable with this prior art wheel suspension.

An intentional steering is possible with another known wheel suspension for front wheel driven vehicles in which a spring leg, a longitudinal guide member and two cross guide members arranged parallel to one another and one behind the other at a distance from one another are provided at each rear wheel-wheel carrier, of which the forward cross guide member is secured with its outer end at the lower end of the spring leg and with its inner end at the vehicle body whereas the rear cross guide member is connected with its outer end by way of a steering lever also with the lower end of the spring leg and with its inner end with a thrust rod actuatable hydraulically or by an electric motor (DE-OS No. 35 07 098). However, this prior art wheel suspension is costly. In this prior art construction, the vehicle body is supported by way of the support springs of the spring legs.

An intentional steering is also provided in a further known wheel suspension for driven rear wheels of passenger motor vehicles with four-wheel steering, in which a support spring supporting the vehicle body which is constructed as coil spring and is arranged in front of the wheel drive shaft, is supported on the wheel side on an inclined guide member serving as wheel guide member which is arranged underneath the wheel drive shaft, is constructed fork-shaped and is elastically supported at the vehicle body by way of one bearing in front and one bearing behind the wheel drive shaft and for steering purposes can be displaced in its plane by means of an adjusting motor under deformation of the elastic bearings (EP-OS No. 96345, FIGS. 16 and 17). In this prior art wheel suspension, a shock absorber is provided as further wheel guide member. A kinematically exact steering is not assured by reason of the deformability of the elastic bearing.

The present invention is concerned with the task to provide a wheel suspension of the aforementioned type which enables an intentional steering of the rear wheels while maintaining the compact construction which is known from the wheel suspension mentioned first hereinabove.

The underlying problems are solved according to the present invention in that with an arrangement having two lower cross guide members, the rear cross guide member and with an arrangement having two upper cross guide members, the forward cross guide member supports the support spring and for the limited steering of the rear wheels the supporting cross guide member is connected at its inner end with a thrust rod that is operatively connected with an adjusting motor, and is displaceable in the vehicle transverse direction by the adjusting motor. It is achieved by the present invention with simple means that an exact steering can be carried out at will within the extent limited for the steering of the rear wheels by means of a wheel suspension which altogether requires only a small installation space and in which in particular the space between the rear wheels can be utilized for other purposes, for example, as luggage space.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 2 is a perspective view of a modified embodiment of a wheel suspension in accordance with the present invention, also from above, the left and the rear.

DETAILED DESCRIPTION OF THE DRAWINGS

Figure 1:
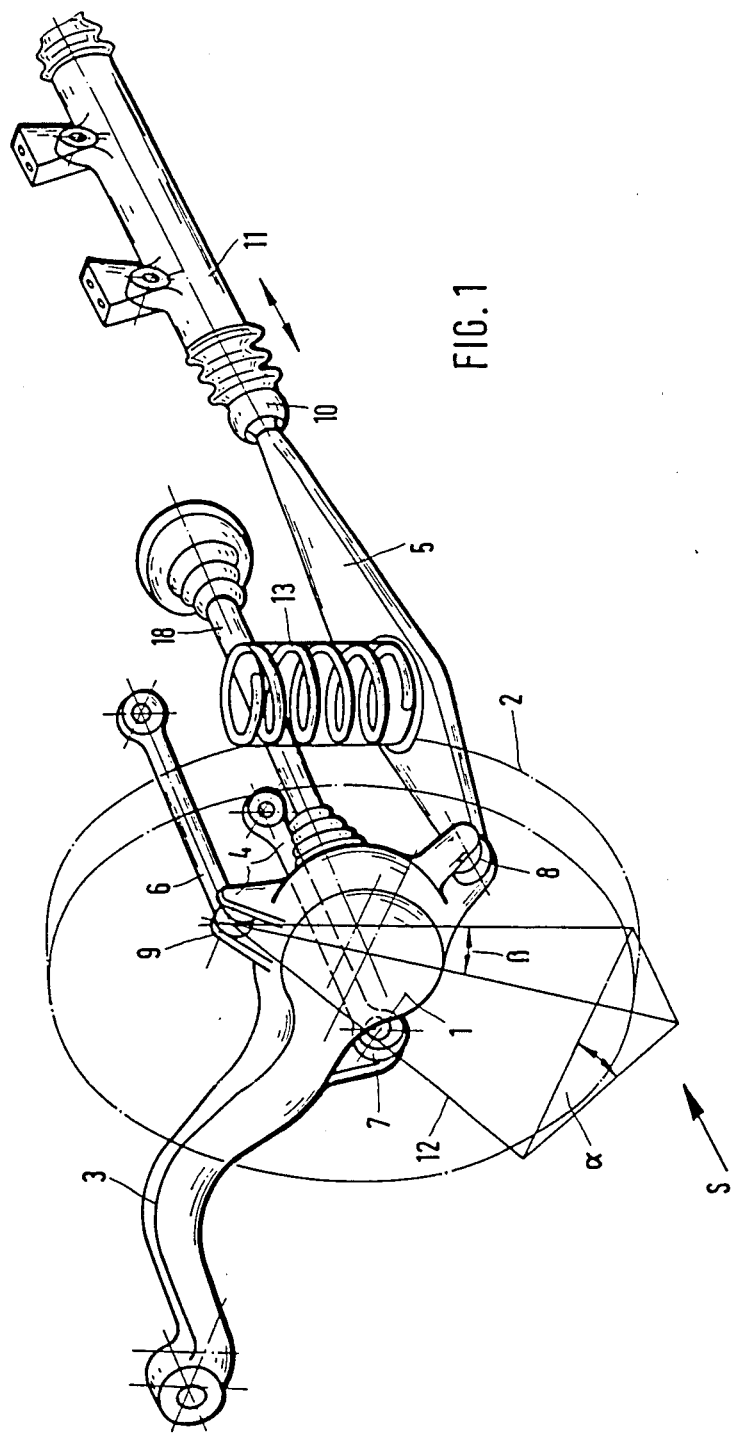
FIG. 1 is a perspective view of a wheel suspension in accordance with the present invention from above, the left and the rear.

Referring now to the drawing wherein like reference numerals are used throughout the two views to designate like parts, and more particularly to FIG. 1, according to this figure, a wheel carrier 1 for the left rear wheel 2 of a passenger motor vehicle, not shown in detail, which is equipped in a customary manner with a front steering system, is constructed in one piece with a longitudinal guide member 3 which extends forwardly from the wheel carrier 1 at least approximately in the vehicle longitudinal direction and is supported at its forward end at the vehicle body. The wheel carrier 1 and longitudinal guide member 3 form together a longitudinal control arm.

A forward cross guide member 4, a rear cross guide member 5, and an upper cross guide member 6 engage at the wheel carrier 1 which extend each at least approximately in the vehicle transverse direction. The cross guide members 4, 5 and 6 are connected with the wheel carrier 1 at their outer ends by way of a forward joint 7, a rear joint 8 and an upper joint 9, respectively. As viewed in side view, the three joints 7, 8 and 9 form the corners of a triangle. The forward joint 7 and the rear joint 8 are located below the wheel center and the upper joint 9 is located above the wheel center. In vertical projection, the upper joint 9 is arranged between the forward joint 7 and the rear joint 8.

At their inner ends, the forward cross guide member 4 and the upper cross guide member 6 are fixedly supported in their longitudinal direction, i.e., in the vehicle transverse direction, at an auxiliary or subframe elastically supported at the vehicle body. The inner end of the rear cross guide member 5 is connected with the left end of a thrust rod or connecting rod 10 of an adjusting motor 11 which is also secured at the auxiliary frame or subframe. The thrust rod or connecting rod 10 which like the rear cross guide member 5 extends in the vehicle transverse direction is displaceable together with the same in the vehicle transverse direction.

The forward joint 7 and the upper joint 9 of the two cross guide members 4 and 6 fixed in the vehicle transverse direction define a steering axis of rotation 12 which rises rearwardly and about which the wheel carrier 1 together with the longitudinal guide member 3 is pivotal with the assist of the rear cross guide member 5. The left rear support spring 13 of the support springs carrying the vehicle body is supported on the rear cross guide member 5. The place of support for the support spring 13 is arranged spaced approximately one-third of the length of the cross guide member from its outer end, i.e., from the rear joint 8 at the wheel carrier 1. The left rear shock absorber which may form a structural unit together with the support spring 13, is also supported at the rear cross guide member 5 which, in its turn, is supported at its outer end at the wheel carrier 1 and at its inner end at the thrust rod 10. A wheel drive shaft 18 serves for the drive of the rear wheel 2.

During a pivoting of the wheel carrier 1 about the steering axis of rotation 12 effected by the rear cross guide member 5, which steering axis of rotation extends through the centers of the forward joint 7 and of the upper joint 9, an inclined positioning of the rear wheel 2 results about the steering deflection angle alpha. At the same time, a change of the camber of the rear wheel 2 about the camber change angle beta results. This displacement of the rear wheel effects a rapid build-up of a lateral force S which has as a consequence a lateral shift of the vehicle.

By reason of the steering deflection which is only small with the rear wheel steering system, only slight displacements of the cross guide member 5 are required so that also the support of the support spring 13 located on the cross guide member 5 is displaced laterally only slightly during the steering.

The forward joint 7 and the upper joint 9 are appropriately so arranged that the steering axis of rotation 12 extends in such a manner that for the forward driving direction a caster results for the rear wheel 2. The steering axis of rotation 12 must not necessarily extend in a vertical plane extending in the vehicle longitudinal direction. It can also extend in a plane inclined in the vehicle longitudinal direction so that a king-pin axis inclination will result in an advantageous manner for the steering axis of rotation 12.

The forward bearing support of the longitudinal guide member 3 is so constructed that it permits the displacements which the forward end of the longitudinal guide member 3 experiences during the pivot movements about the steering axis of rotation 12.

The wheel suspension according to FIG. 2 differs from that according to FIG. 1 in that the inner end of the cross guide member 5 displaceable in the vehicle transverse direction is not pivotally connected at a thrust rod but instead at an intermediate lever 14. This intermediate lever 14 is pivotally supported at the auxiliary frame (not shown) about a pivot axis extending at least approximately in the vehicle longitudinal direction by way of an intermediate connecting member 15. Additionally, the intermediate lever 14 is connected with a thrust rod or connecting rod 16 of an adjusting motor 17. In this construction, the thrust or connecting rod, differing from the construction according to FIG. 1, is not subjected to loads from the support forces of the support spring 13.

Differing from the illustrated embodiments, the cross guide members may be arranged in such a manner that two of the three joints are located above and the third joint is located below the wheel center. This lower joint is thereby so arranged that it is arranged in vertical projection between the two upward joints. With this arrangement, the steering axis of rotation is defined by the joints located at the wheel carrier of the rear upper guide member and of the lower guide member. The forward upper guide member serves for purposes of steering and support of the support spring. However, the arrangement illustrated in FIGS. 1 and 2 offers the advantage of a construction requiring particularly little installation space.

In lieu of being supported at an auxiliary frame or subframe, the cross guide members may also be supported directly at the vehicle body. Additionally, it is possible to construct the longitudinal guide member two-partite and to pivotally connect with each other the two guide member parts by a hinge joint having an axis extending parallel to the steering axis of rotation and permitting transverse movements. Therebeyond, it is also possible to construct the longitudinal control arm bendable in the transverse direction.

The support spring may be constructed, as illustrated in the two embodiments, as coil spring. However, also other types of springs can be used. For example, the support spring may be constructed as pneumatic spring.

The right rear wheel suspension is constructed symmetrically to the left rear wheel suspension explained hereinabove. A simple construction results if a common thrust or connecting rod is provided for the two cross guide members displaceable in the vehicle transverse direction and provided on the left and right vehicle side.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A wheel suspension for rear wheels of motor vehicles equipped with front wheel steering, comprising a wheel carrier means for each rear wheel which is operatively connected with a relatively fixed vehicle part by way of wheel guide means, of which at least three wheel guide means are constructed as cross guide means extending at least approximately in the vehicle transverse direction, joint means operatively connecting the cross guide means with the wheel carrier means, two joint means being located below the wheel center and the third joint means above the wheel center or two joint means being located above the wheel center and the third joint means below the wheel center, support spring means for each rear wheel supporting the vehicle body, the support spring means being supported on the side of the wheel at one of the cross guide means, wherein with an arrangement having two lower cross guide means the rear cross guide means supports the support spring means and with an arrangement having two upper cross guide means the forward support cross guide means supports the support spring means, the supporting cross guide means being operatively connected at its inner end with a thrust rod means for the limited steering of the rear wheel, adjusting means operatively connected with the thrust rod means, and the supporting cross guide means being displaceable in the vehicle transverse direction by the adjusting means.

2. A wheel suspension according to claim 1, wherein the adjusting means is an adjusting motor.

3. A wheel suspension according to claim 1, wherein a triangular arrangement is provided for the joint means by way of which the cross guide means are connected with the wheel carrier means.

4. A wheel suspension according to claim 1, wherein the third of the three joint means is arranged between the two other joint means as viewed in vertical projection.

5. A wheel suspension according to claim 1, wherein the support spring means is constructed as coil spring.

6. A wheel suspension according to claim 1, further comprising shock absorber means arranged between the cross guide means displaceable in the vehicle transverse direction and the vehicle body.

7. A wheel suspension according to claim 1, wherein the cross guide means displaceable in the vehicle transverse direction is connected at its inner end directly with the thrust rod means.

8. A wheel suspension according to claim 1, wherein the cross guide means displaceable in the vehicle transverse direction is pivotally connected at its inner end at an intermediate lever means which is pivotally supported at a relatively fixed vehicle part about a pivot axis extending at least approximately in the vehicle longitudinal direction and is operatively connected with the thrust rod means.

9. A wheel suspension according to claim 1, wherein the cross guide means displaceable in the vehicle transverse direction of both vehicle sides are operatively connected with a common thrust rod means.

10. A wheel suspension according to claim 4, further comprising shock absorber means arranged between the cross guide means displaceable in the vehicle transverse direction and the vehicle body.

11. A wheel suspension according to claim 7, wherein the cross guide means displaceable in the vehicle transverse direction of both vehicle sides are operatively connected with a common thrust rod means.

12. A wheel suspension according to claim 11, wherein the third of the three joint means is arranged between the two other joint means as viewed in vertical projection.

13. A wheel suspension according to claim 8, wherein the cross guide means displaceable in the vehicle transverse direction of both vehicle sides are operatively connected with a common thrust rod means.

14. A wheel suspension according to claim 13, wherein the third of the three joint means is arranged between the two other joint means as viewed in vertical projection.

15. A wheel suspension according to claim 4, wherein a triangular arrangement is provided for the joint means by way of which the cross guide means are connected with the wheel carrier means.

* * * * *